UNITED STATES PATENT OFFICE.

WILLARD H. GOODFELLOW, OF DETROIT, MICHIGAN.

PROCESS FOR FILLING HOLLOW TIRES.

993,054.      Specification of Letters Patent.      Patented May 23, 1911.

No Drawing.      Application filed October 10, 1910. Serial No. 586,385.

*To all whom it may concern:*

Be it known that I, WILLARD H. GOODFELLOW, a citizen of the United States, and a resident of Detroit, in the county of Wayne and State of Michigan, have invented a new and useful Process for Filling Hollow Tires, of which the following is a specification.

This invention relates to filling materials for hollow vehicle tires, and the process of preparing and introducing the same, and the object of this invention is to provide a resilient filler which may be introduced into vehicle tires while in position on the wheels.

When tire casings become worn or cut, the inner tube is liable to explode, causing the tire to flatten and be cut to pieces by the rim. To prevent this, attempts have been made to fill the inner tube with yielding materials such as glues, gelatins, gums, and even liquids, but none have proved satisfactory. A satisfactory casing filler has been produced by introducing a ring of short cylinders of sponge-rubber, but such construction is too expensive. The present process insures the introduction of a satisfactory rubber substitute, fully as light and resilient as sponge-rubber, and much less expensive.

It has long been known that many of the vegetable juices and oils, besides rubber, can be vulcanized by the use of heat and sulfur. Many of them yield an elastic material having good resistance to compression, but with little tensional strength.

I have found that corn-oil is the most desirable for the present purpose as the resultant material is light, extremely elastic, and does not change with time when inclosed in a tire casing or inner tube. The process of preparing this material and of introducing the same into a tire is as follows. Corn-oil is heated to a temperature of about 320 degrees F. for several minutes and then permitted to fall to about 312 degrees. About twenty-five per cent. in weight of melted commercial sulfur is then stirred in and the temperature kept up until the liquid begins to thicken which usually occurs after thirty minutes and in less than an hour, depending upon the oil and the quantity. Next a quantity of flour of cork may be added if desired, twelve per cent. being a desirable amount, its effect being to render the finished substance lighter in weight. When the mixture has been completed it is introduced into the tire under pressure, by any desirable device. A cylinder having a filling aperture and a screw-threaded plunger has been found adapted for this purpose. This cylinder must be heated to about 200 degrees Fahrenheit, otherwise the liquid will be chilled before vulcanization of the oil is more than fairly begun, resulting in a gummy paste of no value.

In filling automobile-tire inner-tubes, the usual air valve is replaced by one having a larger aperture so that the liquid may flow freely into the tube. After the tire has been filled, and under a pressure of from eighty to one hundred pounds per square inch, it is wrapped in heat retaining materials and permitted to slowly cool, requiring about twenty-four hours to reach a temperature of one hundred degrees Fahrenheit.

The vulcanizing of the oil begins at the instant the sulfur is introduced, but the process is very slow, so much so that a slight thickening only is noticed at the end of one-half hour. The chemical change causes a rise in temperature and care must be exercised to prevent carbonizing the oil. The vulcanizing continues within the casing or tube until the resultant mass is a soft, elastic material, highly resilient, and admirably adapted for the purpose. Tensile strength is not necessary.

Having now explained my process, what I claim as my invention and desire to secure by Letters Patent is:—

1. A process for filling vehicle tires which consists in heating a vegetable oil, introducing sufficient sulfur to vulcanize the oil while maintaining a sufficient temperature for such purpose, pumping the mixture while hot by means of a previously heated pump into the tire after the vulcanizing has begun and permitting the vulcanizing to complete within the tire, and the mixture to cool slowly.

2. A process for filling vehicle tires, which consists in heating corn oil to a temperature above three hundred degrees Fahrenheit, adding melted sulfur, and after the oil has begun to vulcanize, pumping the mixture while still hot, by means of a previously heated pump, into the tire, there permitting the vulcanizing to complete and the tire to cool slowly.

3. A process for filling vehicle tubes and tires, which consists in heating corn-oil, then adding sufficient sulfur to vulcanize the oil, adding cork in the form of flour, then forcing the material, while still hot, into the tube or tire and causing it to cool slowly.

In testimony whereof I have signed this specification in the presence of two subscribing witnesses.

WILLARD H. GOODFELLOW.

Witnesses:
 JOHN D. HARGER,
 EDWARD N. PAGELSEN.